No. 757,559. PATENTED APR. 19, 1904.
G. MARCONI.
WIRELESS TELEGRAPH SYSTEM.
APPLICATION FILED NOV. 19, 1901.
NO MODEL. 2 SHEETS—SHEET 1.
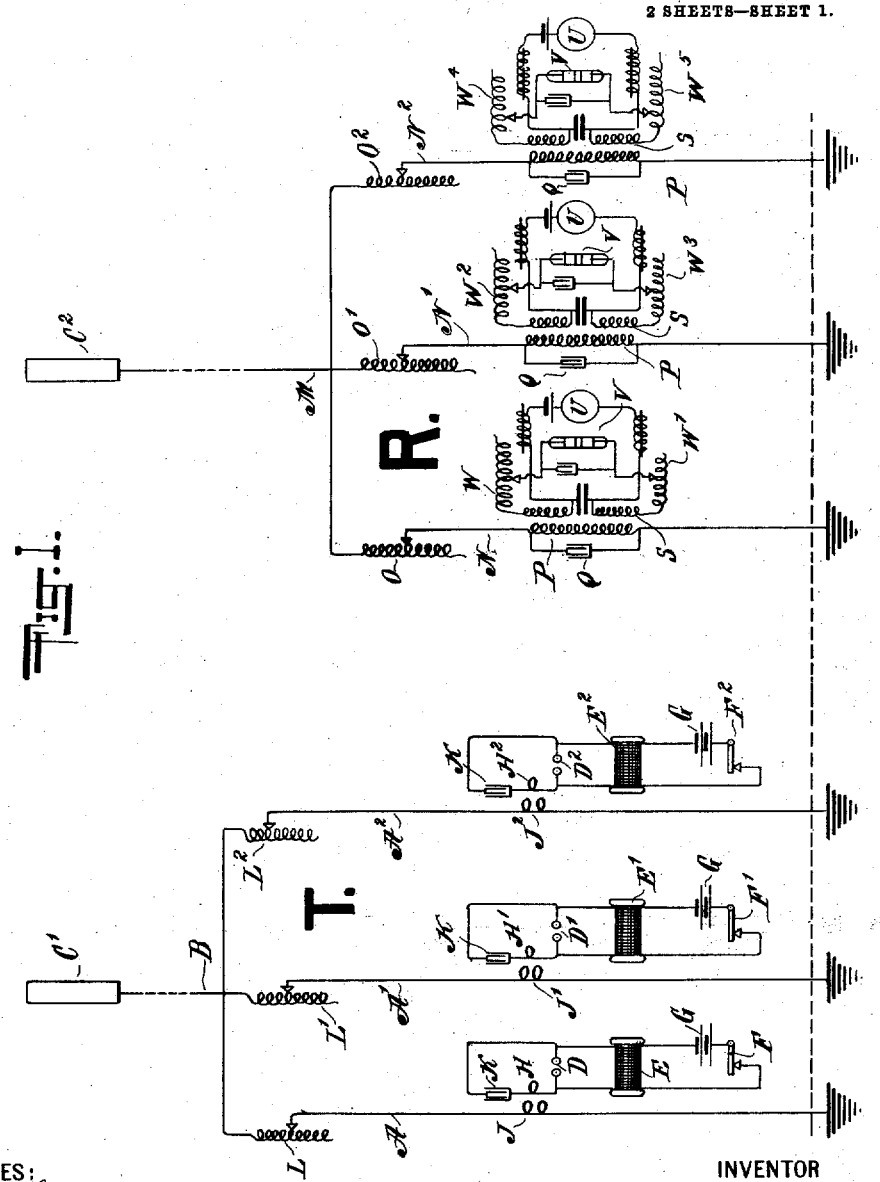
WITNESSES:
INVENTOR
Guglielmo Marconi.
BY
ATTORNEYS.

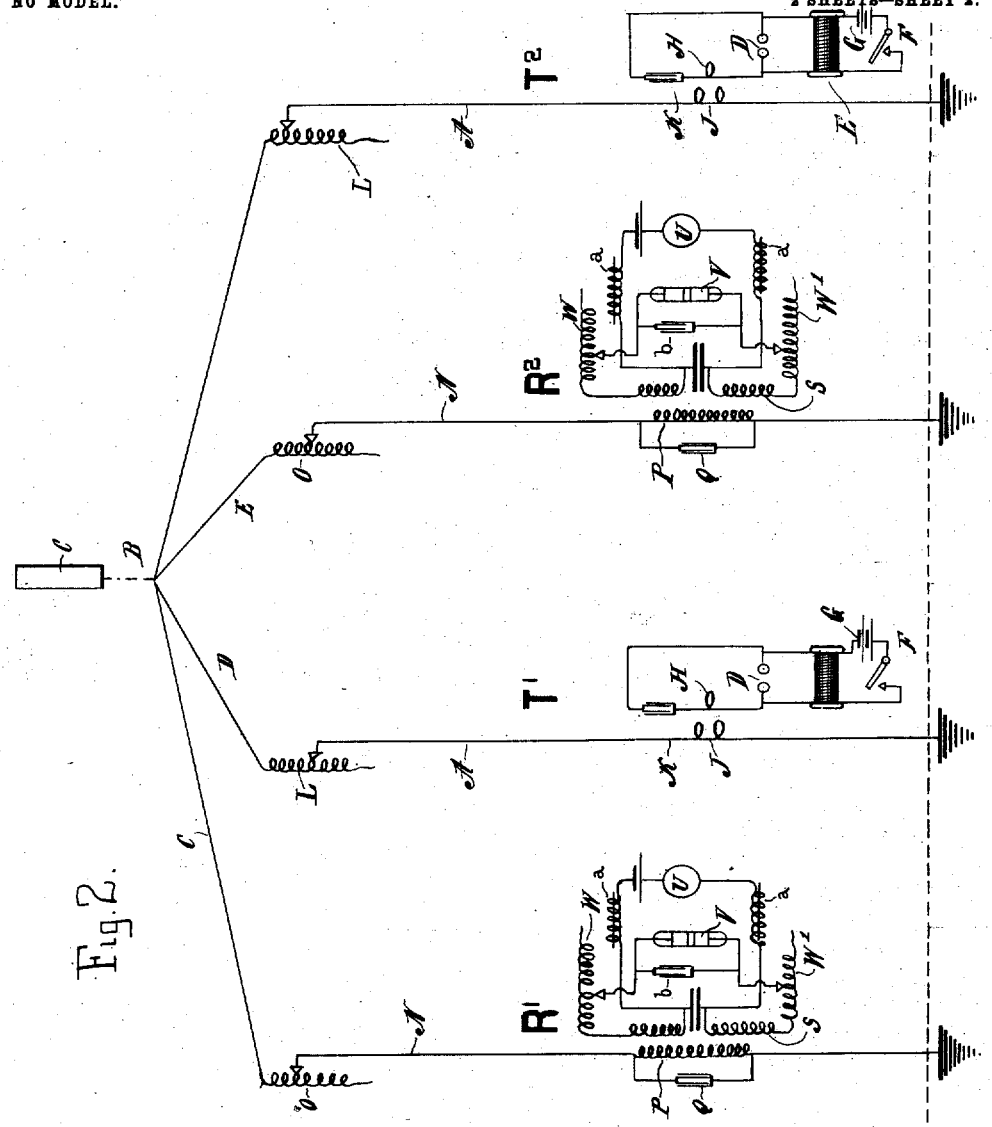

No. 757,559.

Patented April 19, 1904.

UNITED STATES PATENT OFFICE.

GUGLIELMO MARCONI, OF LONDON, ENGLAND, ASSIGNOR TO MARCONI'S WIRELESS TELEGRAPH COMPANY, LIMITED, OF LONDON, ENGLAND, A CORPORATION.

WIRELESS-TELEGRAPH SYSTEM.

SPECIFICATION forming part of Letters Patent No. 757,559, dated April 19, 1904.

Application filed November 19, 1901. Serial No. 82,856. (No model.)

*To all whom it may concern:*

Be it known that I, GUGLIELMO MARCONI, a subject of the King of Italy, residing and having a post-office address at 18 Finch Lane, Threadneedle street, London, England, have invented certain new and useful Improvements in Wireless-Telegraph Systems, of which the following is a full and true description, reference being had to the accompanying drawings, showing diagrammatically one embodiment of my invention.

The object of the present invention is, first, to provide at a transmitting-station employed in wireless telegraphy a plurality of instruments, either for transmitting or receiving, all electrically connected, through connections of different inductance, with an aerial radiating-conductor common to several or all of the instruments; second, to provide at a station employed in wireless telegraphy one or more transmitting instruments and one or more receiving instruments, all electrically connected through connections of different inductance with an aerial absorbing-conductor common to both classes of instruments, and, third, to provide a system for wireless telegraphy wherein at one station a plurality of instruments (of either or both kinds) may be employed simultaneously, all being connected to a common aerial conductor, and wherein at a distant station a common aerial conductor is employed, with a plurality of instruments (of either or both kinds) electrically connected to said conductor employing electrical connections which permit only the desired receiver or receivers to be affected upon the operation of the corresponding transmitting instrument or instruments aforesaid.

In the accompanying drawings I have shown the employment of oscillation-producers, oscillation-transformers, variable inductance-coils, radiating and absorbing conductors, receivers, responders, condensers, and other forms of apparatus. I may employ the structures described and shown in my United States Patents Nos. 586,193, (Reissue No. 11,913,) 624,516, 650,110, 627,650, and 668,315, and my pending application, Serial No. 36,010, filed November 10, 1900; but other suitable forms may be employed.

Figure 1 illustrates a system embodying two stations, a transmitting-station and a receiving-station; and Fig. 2 illustrates a station provided with both transmitting and receiving apparatus.

In Fig. 1, T indicates a transmitting-station, and R indicates a receiving-station. A A' A² indicate the outgoing conductors of the radiating-circuits, all being connected to earth and to a common aerial radiating-conductor C' by means of wire B. The radiating conductor is shown tubular in form. D D' D² indicate the oscillation-producers, spark-balls for producing Hertz oscillations being shown. They are connected in circuit with induction coils or transformers E, E', and E², the primary coils of which are in circuit with signaling-keys F, F', and F² and batteries G. H H' H² indicate the primary coils of oscillation-transformers, the secondary windings of which, J J' J², are in circuit with the outgoing conductors A, A', and A². In circuit with each of the primary coils H, H', and H², I prefer to include a condenser K, a common form of slide-tube condenser being shown for simplification. The connections described comprise for each operator, as more fully explained in my pending application, Serial No. 36,010, filed November 10, 1900, one substantially closed circuit constituting a persistent oscillator and one open circuit in inductional relation with the first-named circuit through an oscillation-transformer and constituting a good radiator of Hertz oscillations. Each of the lines A A' A² connects with wire B through inductance-coils L L' L², which may be variable and which differ from each other in inductance, this being effected in any well-known manner—for instance, adjusting, as desired, when variable inductances are employed.

Referring now to the receiving-station R, I have shown an aerial absorbing-conductor, preferably cylindrical in form, with which by means of wire M the several receiving apparatus are connected. The several receiving-wires N, N', and N² are connected to M through inductance-coils O, O', and O² and are earthed or otherwise connected to capacity. The inductances are of different tune or inductance, and for the best results I prefer to employ variable inductance. Each line N N' N² includes the primary roll P of an oscillation-transformer. A shunt containing a condenser Q may be placed around each said primary coil. This condenser when used has the effect of increasing the period of the coil P without its being necessary to increase the number of turns of said coil. It also allows shorter waves than those intended to actuate or effect the receivers to pass to earth without affecting the instruments. The secondary S of the oscillation-transformer may be of any suitable form; but I prefer to employ an oscillation-transformer the secondary of which is wound in two parts, substantially as shown and described in United States Patent No. 668,315, dated February 19, 1901, granted to me, and as shown and described in my pending application, Serial No. 36,010, filed November 10, 1900, for Letters Patent of the United States. With the condenser constituting the break in each secondary the receivers U and batteries may be connected with or without interposed choking-coils $a$, Fig. 2, and in circuit with the winding of each secondary may be included the detector V in parallel with a suitable slide-condenser $b$, Fig. 2, one or more inductance-coils being also included in each detector-circuit. In the drawings I have shown variable inductance-coils (designated W W' W² W³ W⁴ W⁵) and two inserted in each circuit, one between each terminal of the secondary and the detector.

In practice the operator will adjust the inductance of the lines A, A', and A² at T, so as to give each line an inductance different from that of the others. This may be done by moving a part of the variable inductance-coils L, L', and L² in any well-known way. The oscillation-producing or primary circuit of each line is also brought into accord (by adjusting the condenser K or otherwise) with the adjusted radiating line, and the transmitting-station is then in a position to permit a number of operators (as many as there are outgoing lines) to simultaneously or successively send different signals which differ in amplitude, and all of which are radiated from the common aerial C'. These oscillations, propagated in the usual way, may be received at several separated stations provided with one or more receiving-circuits provided with inductance adjusted to accord with the particular transmitting line or lines from which signals are to be received. As shown, however, each receiving-station R may be provided with a plurality of receivers, each of which is included in circuit with the common absorbing aerial through inductance-coils adjusted to accord with the adjustments at the transmitting-station, in which event the oscillations of different frequency propagated at T will be received at R and directed over the line O or O' or O², each adjusted to receive oscillations propagated at corresponding producers D, D', or D². Wireless-telegraph stations embodying my present invention may, however, be provided with both transmitting instruments and receiving instruments, thus adapting each station for both purposes. Referring to Fig. 2, wherein I have illustrated such a combined station, it will be seen that the transmitting and receiving instruments are separately connected through the inductances L L and O O. The parts of each apparatus are marked as in Fig. 1.

While I have herein shown and described practical embodiments of my invention, I do not desire to be understood as confining my invention to the said embodiments. Others will readily suggest themselves to skilled persons and will be found to be included in my claims.

What I claim is—

1. At a station employed in wireless telegraphy, a conductor, a plurality of open circuits electrically connected with said conductor, a corresponding number of instruments one electrically connected with each open circuit, and means whereby the time periods of the open circuits are caused to differ from each other, substantially as described.

2. At a station employed in wireless telegraphy, a conductor, a plurality of open circuits electrically connected with said conductor, a corresponding number of instruments one electrically connected with each open circuit, and a variable inductance included in each open circuit, substantially as described.

3. At a station employed in wireless telegraphy, a conductor, a plurality of instruments, a corresponding number of electrical transformers, one circuit of each transformer being electrically connected with the conductor and the other circuit of which includes one of the instruments aforesaid, and means for adjusting the time periods of each pair of transformer-circuits so as to be in accord with each other, whereby the time periods of the circuits connected with the common conductor are caused to differ from each other, substantially as described.

4. At a station employed in wireless telegraphy, a conductor, a plurality of instruments, a corresponding number of electrical transformers, one circuit of each transformer being a persistent oscillator, and the other circuit being a good radiator or absorber, each persistent-oscillator circuit including one of the instruments aforesaid, and means for adjusting the time periods of each pair of circuits so as to be in accord with each other, whereby the time periods of the circuits connected with the common conductor are caused to differ from each other, substantially as described.

5. In a station employed in wireless telegraphy, a conductor, a plurality of connections therefrom, a variable inductance included in each of said connections, and instruments, one for each connection, electrically connected therewith, substantially as described.

6. At a station employed in wireless telegraphy, a conductor, a plurality of connections therefrom, an inductance included in each of said connections, all of said inductances differing, and instruments one for each connection, electrically connected therewith, substantially as and for the purpose described.

7. At a station employed in wireless telegraphy, a conductor, and a plurality of separate instruments electrically connected with the conductor through connections which differ in inductance from each other, substantially as and for the purpose described.

8. At a station employed in wireless telegraphy, a conductor, a transmitting instrument electrically connected with the conductor through an inductance, and a receiving instrument electrically connected with the conductor, through an inductance, the said inductances differing from each other, substantially as and for the purpose described.

9. In a system of wireless telegraphy, a transmitting-station provided with a radiating-conductor, a plurality of separate transmitting instruments electrically connected with the radiating-conductor through connections which differ in inductance from each other, and a receiving-station provided with an absorbing-conductor, and a plurality of separate receiving instruments electrically connected with the absorbing-conductor through connections which differ in inductance from each other, substantially as and for the purpose described.

10. In a system of wireless telegraphy, a transmitting-station provided with a radiating-conductor, a plurality of separate and differently-tuned transmitting instruments electrically connected with the radiating-conductor through connections which differ in inductance from each other, and a receiving-station provided with an absorbing-conductor, and a plurality of separate receiving instruments, electrically connected with the absorbing-conductor, and tuned to accord with the separate transmitting instruments hereinbefore specified, substantially as and for the purpose described.

In witness whereof I have hereunto signed my name at Mullion this 25th day of October, 1901.

GUGLIELMO MARCONI.

In presence of—
WILFRID BLAGDEN,
ARTHUR E. HEMING.

---

It is hereby certified that in Letters Patent No. 757,559, granted April 19, 1904, upon the application of Guglielmo Marconi, of London, England, for an improvement in "Wireless Telegraph Systems," an error appears in the printed specification requiring correction, as follows: In line 8, page 2, the clause "primary roll P" should read *primary coil P;* and that the said Letters Patent should be read with this correction therein that the same may conform to the record of the case in the Patent Office.

Signed and sealed this 10th day of May, A. D., 1904.

[SEAL.]

E. B. MOORE,
*Acting Commissioner of Patents.* the time periods of the circuits connected with the common conductor are caused to differ from each other, substantially as described.

5. In a station employed in wireless telegraphy, a conductor, a plurality of connections therefrom, a variable inductance included in each of said connections, and instruments, one for each connection, electrically connected therewith, substantially as described.

6. At a station employed in wireless telegraphy, a conductor, a plurality of connections therefrom, an inductance included in each of said connections, all of said inductances differing, and instruments one for each connection, electrically connected therewith, substantially as and for the purpose described.

7. At a station employed in wireless telegraphy, a conductor, and a plurality of separate instruments electrically connected with the conductor through connections which differ in inductance from each other, substantially as and for the purpose described.

8. At a station employed in wireless telegraphy, a conductor, a transmitting instrument electrically connected with the conductor through an inductance, and a receiving instrument electrically connected with the conductor, through an inductance, the said inductances differing from each other, substantially as and for the purpose described.

9. In a system of wireless telegraphy, a transmitting-station provided with a radiating-conductor, a plurality of separate transmitting instruments electrically connected with the radiating-conductor through connections which differ in inductance from each other, and a receiving-station provided with an absorbing-conductor, and a plurality of separate receiving instruments electrically connected with the absorbing-conductor through connections which differ in inductance from each other, substantially as and for the purpose described.

10. In a system of wireless telegraphy, a transmitting-station provided with a radiating-conductor, a plurality of separate and differently-tuned transmitting instruments electrically connected with the radiating-conductor through connections which differ in inductance from each other, and a receiving-station provided with an absorbing-conductor, and a plurality of separate receiving instruments, electrically connected with the absorbing-conductor, and tuned to accord with the separate transmitting instruments hereinbefore specified, substantially as and for the purpose described.

In witness whereof I have hereunto signed my name at Mullion this 25th day of October, 1901.

GUGLIELMO MARCONI.

In presence of—
WILFRID BLAGDEN,
ARTHUR E. HEMING.

---

Correction in Letters Patent No. 757,559.

It is hereby certified that in Letters Patent No. 757,559, granted April 19, 1904, upon the application of Guglielmo Marconi, of London, England, for an improvement in "Wireless Telegraph Systems," an error appears in the printed specification requiring correction, as follows: In line 8, page 2, the clause "primary roll P" should read *primary coil P;* and that the said Letters Patent should be read with this correction therein that the same may conform to the record of the case in the Patent Office.

Signed and sealed this 10th day of May, A. D., 1904.

[SEAL.]

E. B. MOORE,
*Acting Commissioner of Patents.*

Correction in Letters Patent No. 757,559.

It is hereby certified that in Letters Patent No. 757,559, granted April 19, 1904, upon the application of Guglielmo Marconi, of London, England, for an improvement in "Wireless Telegraph Systems," an error appears in the printed specification requiring correction, as follows: In line 8, page 2, the clause "primary roll P" should read *primary coil P;* and that the said Letters Patent should be read with this correction therein that the same may conform to the record of the case in the Patent Office.

Signed and sealed this 10th day of May, A. D., 1904.

[SEAL.]

E. B. MOORE,
*Acting Commissioner of Patents.*